US008606012B2

(12) United States Patent
Suzuki et al.

(10) Patent No.: US 8,606,012 B2
(45) Date of Patent: Dec. 10, 2013

(54) IMAGE PROCESSING METHOD AND IMAGE PROCESSOR

(75) Inventors: Tomoharu Suzuki, Inagi (JP); Shinichi Eguchi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 996 days.

(21) Appl. No.: 11/509,844

(22) Filed: Aug. 25, 2006

(65) Prior Publication Data

US 2007/0177825 A1 Aug. 2, 2007

(30) Foreign Application Priority Data

Feb. 2, 2006 (JP) .................................. 2006-25690

(51) Int. Cl.
*G06K 9/46* (2006.01)
(52) U.S. Cl.
USPC ........... 382/190; 382/195; 382/100; 382/168; 382/173
(58) Field of Classification Search
USPC ......... 382/190, 195, 100, 101, 103, 118, 181, 382/115, 144, 168, 173
See application file for complete search history.

(56) References Cited

U.S. PATENT DOCUMENTS

| 5,629,989 A | * | 5/1997 | Osada ............................ 382/281 |
| 5,878,158 A | | 3/1999 | Ferris et al. |
| 5,881,164 A | * | 3/1999 | Ichikawa ....................... 382/149 |
| 6,407,090 B1 | | 6/2002 | Fliss |
| 2004/0116808 A1 | | 6/2004 | Fritz et al. |

FOREIGN PATENT DOCUMENTS

| JP | 11-066324 A | 3/1999 |
| JP | 2002-092616 A | 3/2002 |
| JP | 2002-269539 A | 9/2002 |
| JP | 2003-044860 A | 2/2003 |
| JP | 2004-045356 A | 2/2004 |
| JP | 2004-329825 A | 11/2004 |
| JP | 2005-275500 A | 10/2005 |
| WO | WO 99/51138 A2 | 10/1999 |

OTHER PUBLICATIONS

Bennamoun et al: "A structural-description-based vision system for automatic object recognition", IEEE-SMC-Part B, 1997.*
Kato et al, JP2004-329825, the machine translated English version, 2004.*
Frederic Zana et al., "Segmentation of Vessel-Like Patterns Using Mathematical Morphology and Curvature Evaluation", IEEE Transactions on Image Processing, vol. 10, No. 7, Jul. 2001.

(Continued)

*Primary Examiner* — Ruiping Li
(74) *Attorney, Agent, or Firm* — Westerman, Hattori, Daniels & Adrian, LLP

(57) ABSTRACT

An image processing method extracts line segment elements from grayscale captured images, so that line segments are extracted at high-speed without being influenced by contrast ratio, even if morphology processing is used. A selection processing select an area where continuous line segments possibly exist from the captured image and a morphology processing detect line segment elements in the selected area by scanning an operator. Line segments can be extracted in a plurality of directions at high-speed. Also by an extraction target area selection processing, an area of which contrast ratio is low, continuing from an area of which contrast ratio is high in the line segment growth direction is also extracted as one line segment.

12 Claims, 19 Drawing Sheets

(56) References Cited

OTHER PUBLICATIONS

William T. Freeman et al., "The Design and Use of Steerable Filters", IEEE Trans. Patt. Anal. and Machine Intell., vol. 13, No. 9, pp. 891-906, Sep. 1991.

M. Van Droogenbroeck et al., "Morphological erosions and openings: Fast algorithms based on anchors", *Journal of Mathematical Imaging and Vision*, 2005, draft version.

Kevin Robinson et al., "Efficient Morphological Reconstruction: A Downhill Filter", Pattern Recognition Letters, Apr. 14, 2004.

Thackray et al., "Semi-Automatic Segmentation of Vascular Network Images Using a Rotating Structuring Element (ROSE) with Mathematical Morphology and Dual Feature Thresholding", IEEE Transactions on Medical Imaging, vol. 12, No. 3, Sep. 1993, pp. 385-392.

Eiho et al., "Detection of Coronary Artery Tree Using Morphological Operator", Computers in Cardiology 1997, vol. 24, pp. 525-528, Sep. 7, 1977.

Kirbas et al., "Vessel Extraction Techniques and Algorithms: A Survey", 3rd IEEE Symposium on 10-12, pp. 238-245, Mar. 10, 2003.

Search Report dated May 31, 2007, issued in corresponding European Application No. 06254493.

Extended European Search Report dated Apr. 3, 2008, issued in corresponding Application No. 08101233.8-2218.

Chinese Office Action dated Jan. 29, 2010, issued in corresponding Chinese Patent Application No. 2006101398666 (With English Translation).

Japanese Office Action dated Feb. 1, 2011, issued in corresponding Japanese Patent Application No. 2006-025690.

"Object Detection by Associating Color Frequency with Local Edge Information and Its Application to Player Detection in Soccer Videos"; Technical Report of IEICE PRMU, vol. 101, No. 653, pp. 59-66, published by the Institutes of Electronics, Information and Communication Engineers, Feb. 15, 2002. (partial translation)(cited in Japanese Office Action dated Aug. 23, 2011, issued in corresponding Japanese Application No. 2006-025690).

Japanese Office Action dated Apr. 17, 2012, issued in corresponding Japanese Patent Application No. 2006-025690.

Japanese Office Action dated May 15, 2012, issued in corresponding Japanese Patent Application No. 2011-067114.

Masahide Naemura et al; "Detection of Lawn areas from sport programs"; in image information media society technical report, vol. 21, No. 42, pp. 37-42, published by a corporate junction person image information media society, Jul. 22, 1997.(cited in Japanese Office Action dated May 15, 2012)(Partial English translation).

Asano, "Morphology and Shape Description—Application to filtering and texture analysis", System Control Information Society, dated Jan. 15, 2003, vol. 47, No. 1, (pp. 18-25). Cited in Japanese Office Action dated Sep. 11, 2012. With Partial English Translation.

* cited by examiner

FIG. 10
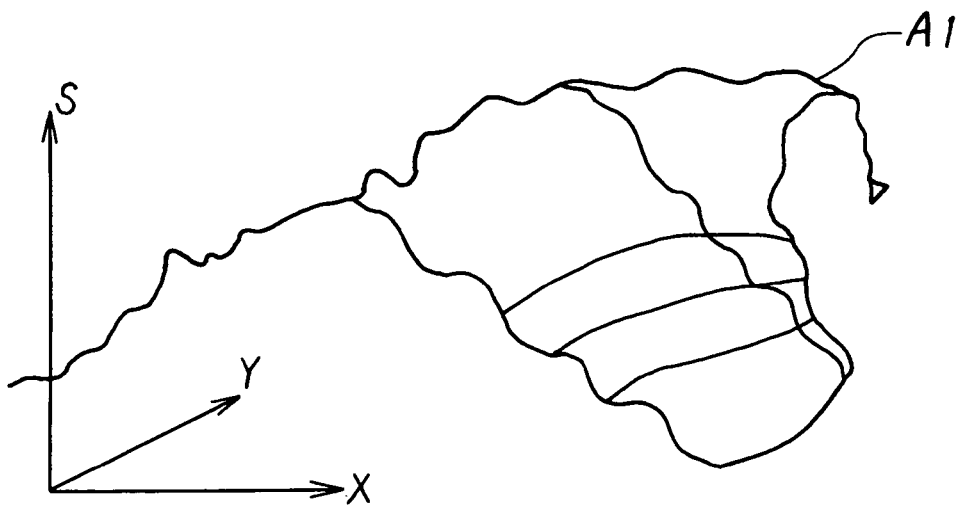
⇩ LOG Filter
(INTEGRATION/DIFFERENTIATION)
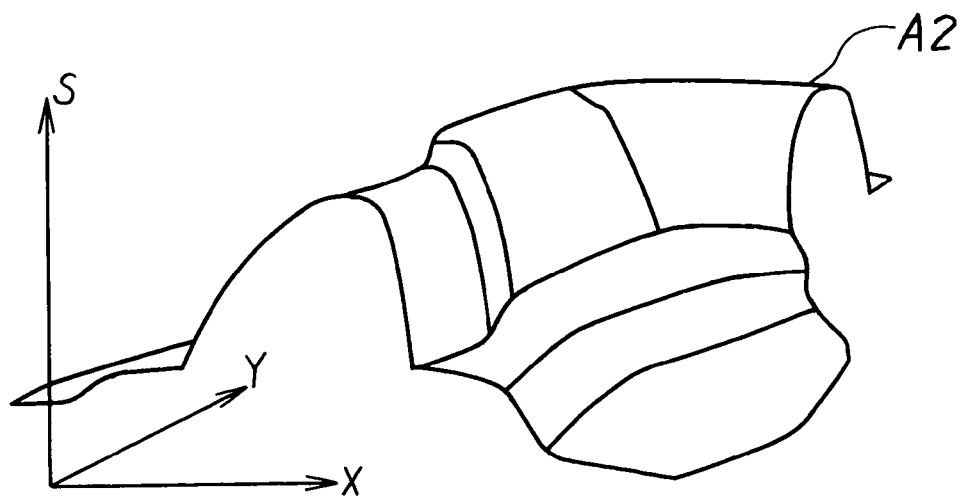

FIG. 19
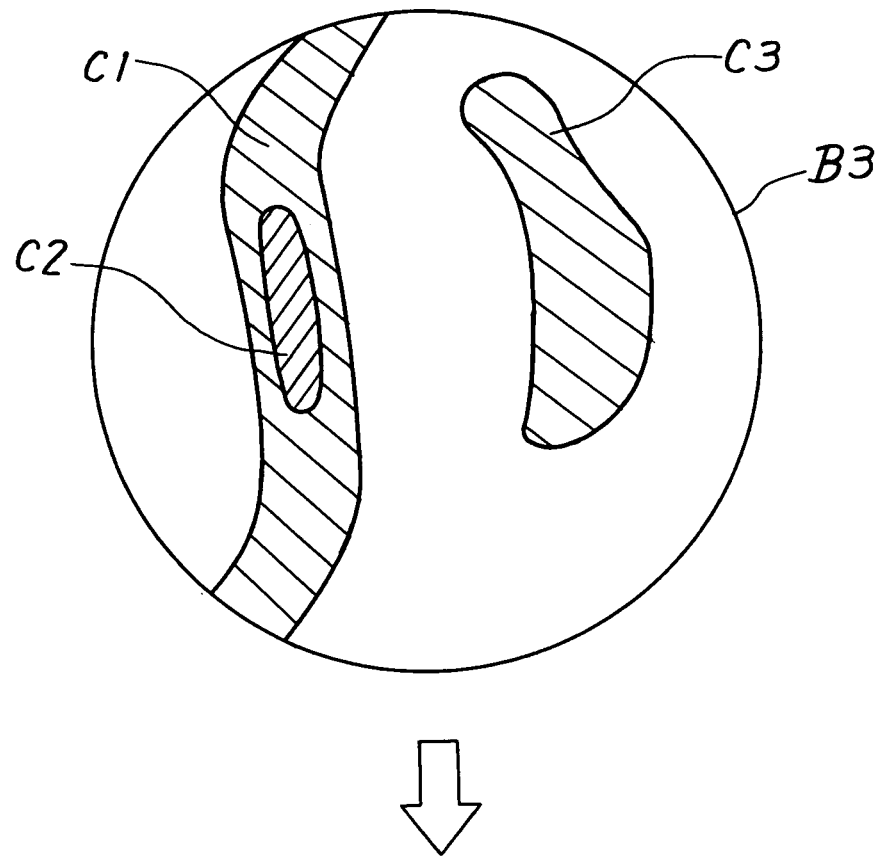
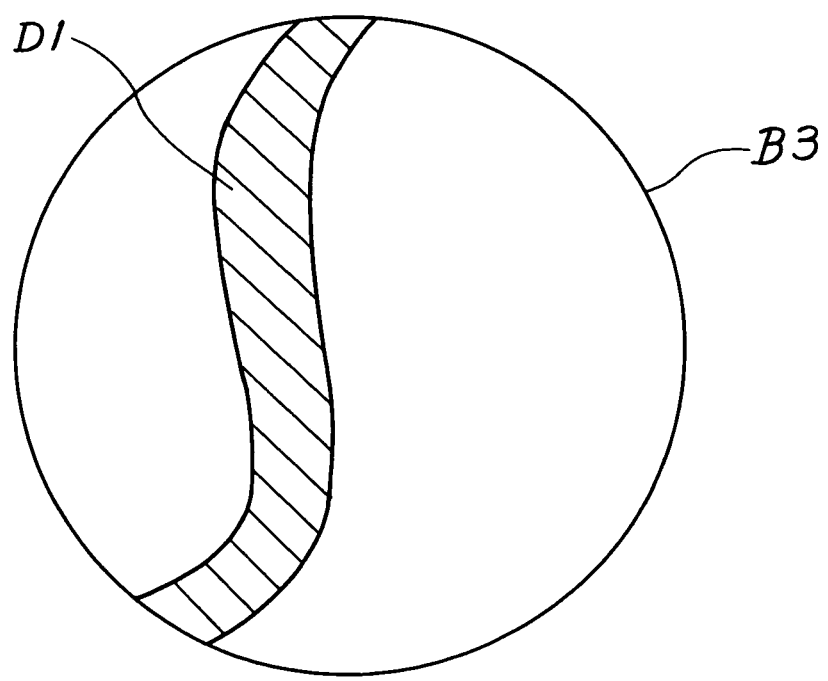

FIG. 20
ORIGINAL IMAGE 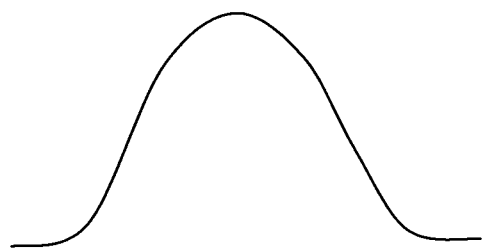
FIRST DIFFERENTIATION 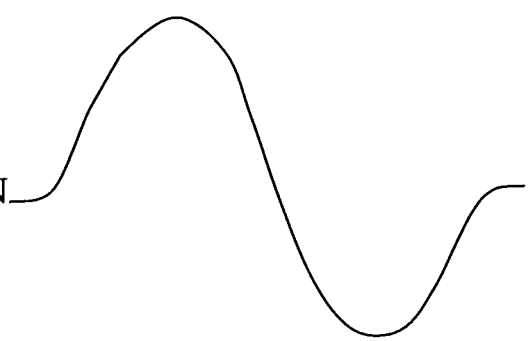
SECOND DIFFERENTIATION 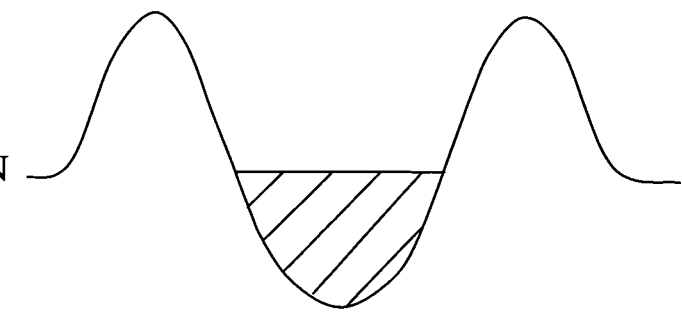
EDGE IMAGE 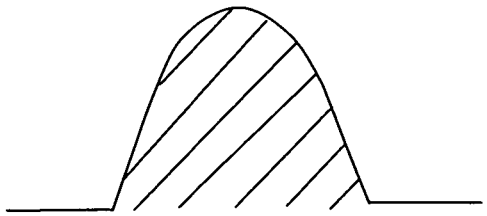

FIG. 21
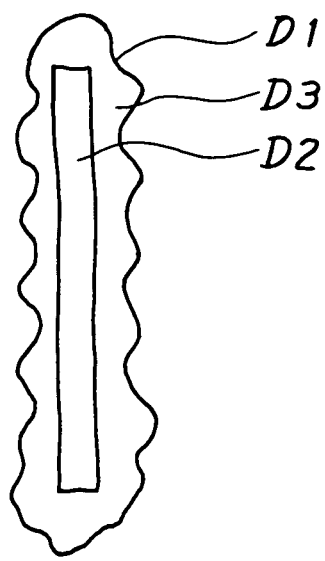
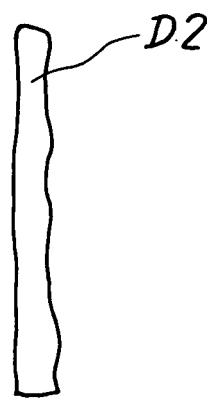

IMAGE PROCESSING METHOD AND IMAGE PROCESSOR

CROSS-REFERENCE TO RELATED APPLICATIONS

This application is based upon and claims the benefit of priority from the prior Japanese Patent Application No. 2006-025690, filed on Feb. 2, 2006, the entire contents of which are incorporated herein by reference.

BACKGROUND OF THE INVENTION

1. Field of the Invention

The present invention relates to an image processing method and an image processor for extracting continuous line segments from a variable density image, and more particularly to an image processing method and an image processor for extracting a linearly connected area from a variable density image, considering the growth direction of the line segments.

2. Description of the Related Art

As current demands for advancements in personal authentication technology increases, many personal authentication technologies using image data acquired by capturing the image of a body (test subject) have been proposed. For example, an image of a portion which can identify an individual, such as fingerprints, eye retina, face and blood vessels, is captured and a characteristic part is extracted from the captured image for personal authentication. The portion suitable for such personal authentication is a portion formed of relatively continuous line segments.

A captured image, on the other hand, has relatively low contrast and includes noise depending on the ambient environment and the image capturing status, so innovation is required for this technology to extract these continuous line segments accurately. For this technology to extract continuous line segments from an image, edge enhancement processing and morphology processing for tracking line segments are effective.

Conventionally it has been proposed that the captured image is binarized, then line segments are extracted using a morphology function and Gaussian Laplacian filter (see Japanese Patent Application Laid-Open No. 2004-329825 (FIG. 3)). However it is difficult to detect line segments accurately by applying morphology technology to an image after binarizing since grayscale data acquired from the captured image is not used.

Also as a method of performing morphology processing on grayscale data, it has been proposed to perform open processing and top hat processing, which is one morphology processing on grayscale data for extracting line segments, such as an image of vessels from the retina image of a human eye ("Segmentation of Vessel-Like Pattern using Mathematical Morphology and Curvature Evaluation" (F. Zana, J. C. Klein, IEEE Trans. Image Processing, Vol. 10, pp. 1010 to 1019, July 2001).

SUMMARY OF THE INVENTION

Morphology processing, however, which requires many repeats of simple calculation and is a non-linear processing, has a problem in that grayscale data processing (computation) takes time. For example, if morphology processing is applied to personal authentication processing, the authentication time becomes long.

Also morphology processing is effective for extracting connected line segments, but if the contrast of the image is low, unconnected line segments are also extracted, and line segment extraction accuracy drops.

With the foregoing in view, it is an object of the present invention to provide an image processing method and an image processor for extracting connected line segments from the grayscale data of an image at high-speed using morphology processing.

It is another object of the present invention to provide an image processing method and an image processor for extracting connected line segments from the grayscale data of an image using morphology processing even if the image has contrast differences.

It is still another object of the present invention to provide an image processing method and an image processor for extracting connected line segments from the grayscale data of an image using morphology processing without being influenced by the image capturing environment.

It is still another object of the present invention to provide an image processing method and an image processor for extracting connected line segments from the grayscale data of a captured living body image using morphology processing.

To achieve these objects, an image processing method for extracting line segment elements from a grayscale captured image, according to the present invention, has a step of binarizing an image according to the captured image and selecting an extraction area of the captured image from the binary image, a step of performing morphology processing by scanning an operator over the selected extracting area in a plurality of directions and extracting linear elements from the extracted image in each direction, and a step of extracting line segment elements from the extracted linear elements.

Also an image processing method for extracting line segment elements from a grayscale captured image, according to the present invention, has a step of scanning an operator over an image according to the captured image in a plurality of directions and executing morphology processing by extracting linear elements from the extracted images in each direction, a step of extracting an area of which the contrast ratio is relatively high and an area of which contrast ratio is relatively low from an image on which morphology processing was performed, and a step of extracting the linear elements in the area of which contrast ratio is relatively low, connecting to the area of which contrast ratio is relatively high, as the line segment elements.

Also an image processor for extracting line segment elements from a grayscale captured image has an image capturing device for capturing the image of a test subject, and a line segment extraction device for binarizing an image according to the captured image which is captured by the image capturing device, selecting an extraction area of the captured image, executing morphology processing by scanning an operation over the selected extraction area in a plurality of directions, extracting linear elements from the extracted image in each direction, and extracting line segment elements from the extracted linear elements.

Also an image processor for extracting line segment elements from a grayscale captured image has an image capturing device for capturing the image of a test subject, and a line segment extraction device for scanning an operator over an image according to the captured image which is captured by the image capturing device in a plurality of directions, executing morphology processing for extracting linear elements from the extracted images in each direction, extracting an area of which contrast ratio is relatively high and an area of which contrast ratio is relatively low from the image on which morphology processing was performed, and extracting the linear elements in the area of which contrast ratio is relatively low, connecting to the area of which contrast ratio is relatively high as the line segment elements.

It is preferable that the present invention further has a step of binarizing an image according to the captured image and selecting an extraction area of the captured image for which morphology processing is executed.

It is also preferable that the present invention further has a step of creating an image according to the captured image by subjecting the grayscale captured image to smoothing and edge enhancement processing.

It is also preferable that the present invention further has a step of subjecting the extracted line segment elements to smoothing and edge enhancement processing, and a step of creating line segment data by binarizing the smoothed and edge enhanced line segment elements.

Also in the present invention, it is preferable that the step of executing the morphology processing further has a step of scanning the operator in a plurality of directions and creating an open processing image in each direction, a step of creating a top hat processing image in each of the directions from an image according to the captured image and the open processing image in each of the directions, and a step of extracting the linear elements by adding the top hat processing image in each of the directions.

Also in the present invention, it is preferable that the step of extracting line segment elements further has a step of specifying an area of which contrast of the image according to the captured image is possibly high, a step of extracting an area of which contrast ratio is relatively high and an area of which contrast ratio is relatively low for the specified area of the morphology-processed image, and extracting linear elements in the area of which contrast ratio is relatively low, connection to the area of which contrast ratio is relatively high as the line segment elements.

Also in the present invention, it is preferable that the step of extracting the area further has a step of calculating a brightness frequency histogram in the specified area, and a step of extracting the area of which contrast ratio is relatively high and area of which contrast ratio is relatively low from the brightness frequency histogram.

Also in the present invention, it is preferable that the extraction step further has a step of extracting a mask area of which brightness level is relatively low as an area of which contrast ratio is relatively low and a marker area of which brightness level is relatively high as an area of which contrast ratio is relatively high, from the brightness frequency histogram.

Also in the present invention, it is preferable that the step of extracting the line segment elements further has a step of extracting a mask area having the marker area as the line segment element.

According to the present invention, morphology processing is performed on an area where continuous line segments possibly exist by scanning an operator, so line segments can be extracted in a plurality of directions at high-speed. Also by the extraction target area selection processing, an area of which contrast ratio is low, continuing from an area of which contrast ratio is high in the line segment growth direction is also extracted as one line segment, so line segments can be extracted with high accuracy regardless the contrast ratio.

BRIEF DESCRIPTION OF THE DRAWINGS

FIG. 10 is diagram depicting the LoG filter processing in FIG. 2;

FIG. 19 area diagrams depicting the reconstruction processing in FIG. 16;

FIG. 20 area diagrams depicting the LoG filter processing in FIG. 2; and

FIG. 21 is diagram depicting the line segment extraction operation by the LoG filter processing in FIG. 20.

DESCRIPTION OF THE PREFERRED EMBODIMENTS

Embodiments of the present invention will now be described in the sequence of the image processor, image processing method and other embodiments.

Image Processor

Figure 1:
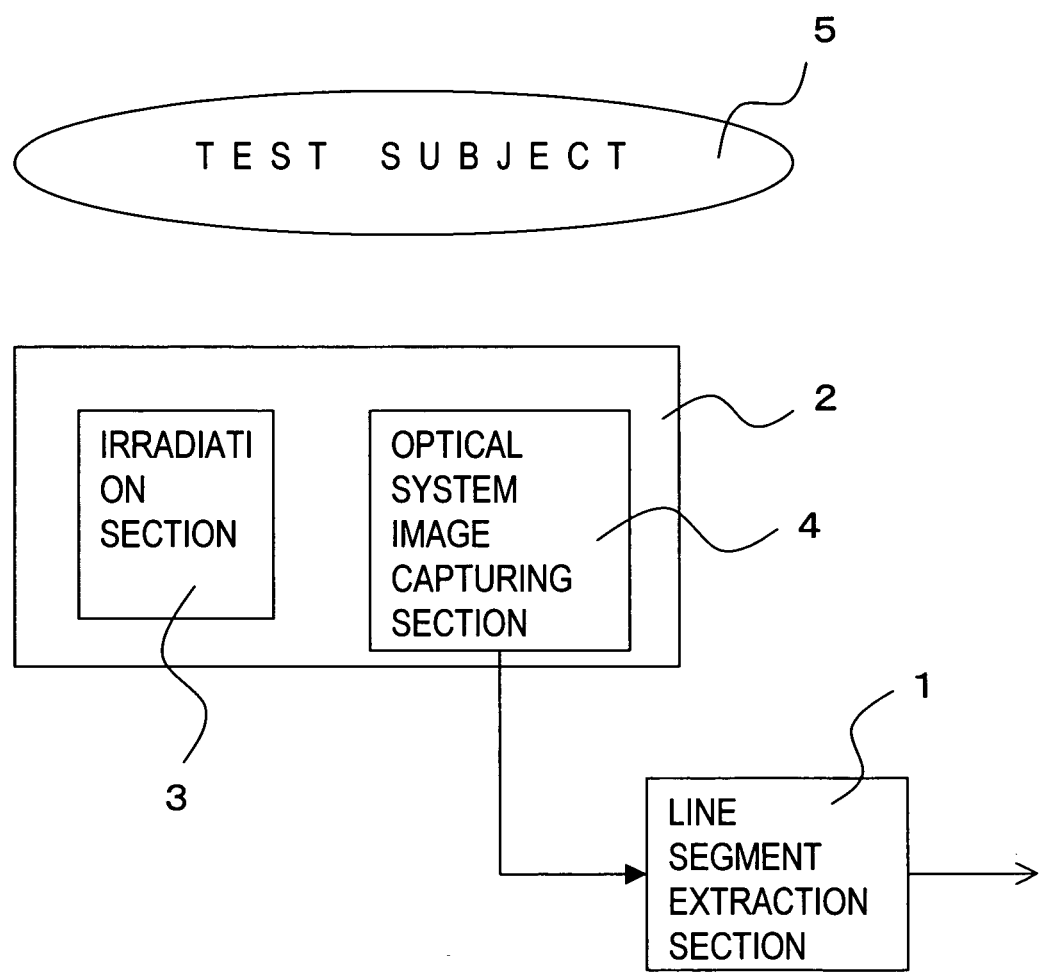
FIG. 1 is a block diagram depicting the image processor according to an embodiment of the present invention.
Figure 2:
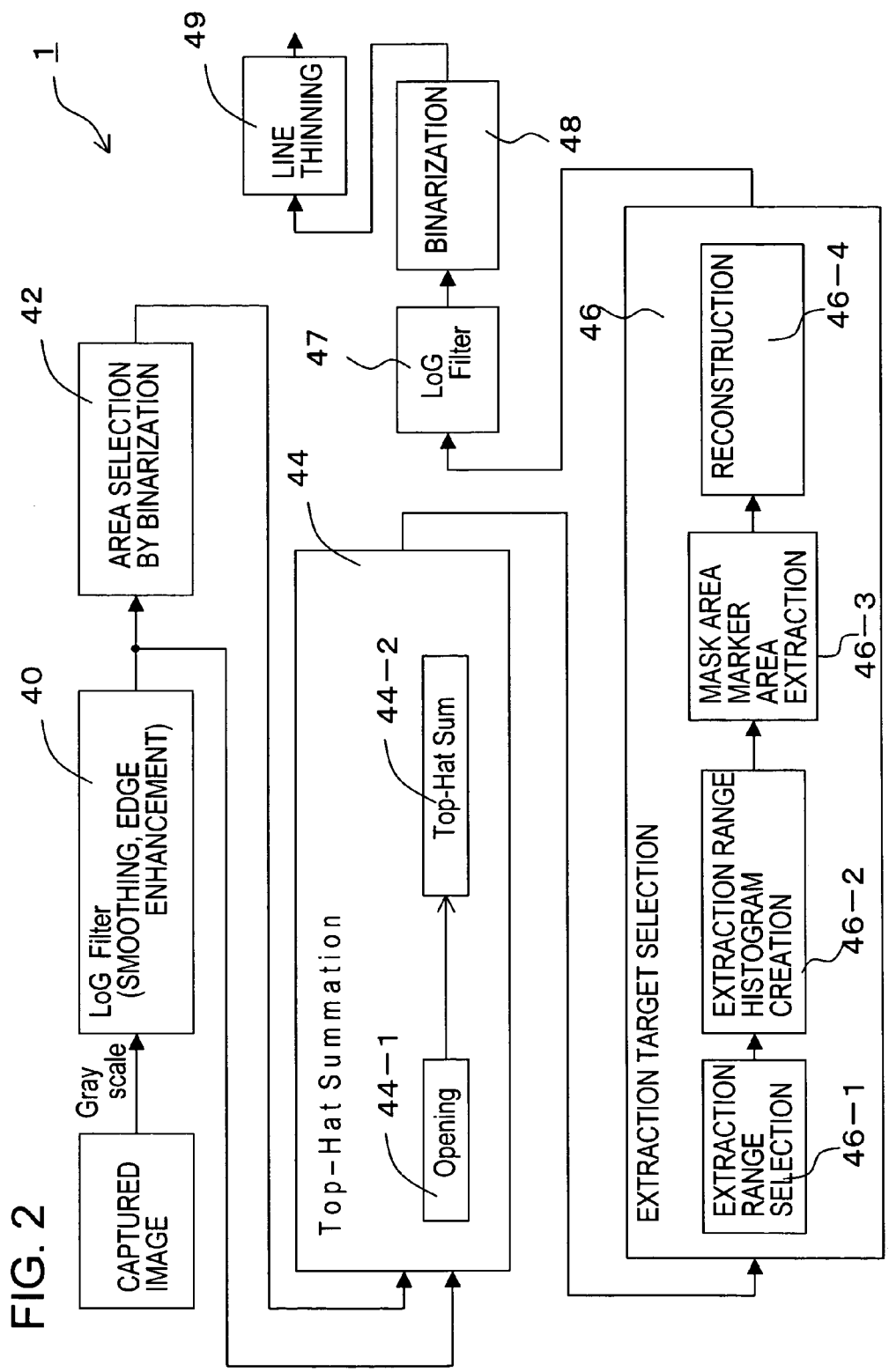
FIG. 2 is a block diagram depicting the line segment extraction section in FIG. 1.

FIG. 1 is a block diagram depicting the image processor according to an embodiment of the present invention, FIG. 2 is a block diagram depicting the line segment extraction section in FIG. 1, and FIG. 3 to FIG. 9 are image processing examples of the line segment extraction section in FIG. 2. FIG. 3 to FIG. 9 are examples of line segment extraction processing of the patterns on the skin surface of the test subject image, but the present invention can also be applied to line segment extraction of images of a living body, such as retina vessels.

As FIG. 1 shows, the image capturing device 2 captures an image of the test subject 5. The image capturing device 2 has a light irradiation section 3 for irradiating light with a desired wavelength to the test subject 5, and an optical system image capturing section 4 for receiving the reflected light from the test subject 5 and converting it into electric signals (image signals). The optical system image capturing section 4 is comprised of an optical mechanism, such as a lens, and an image sensor for converting the received light image into image signals (e.g. CMOS image sensor).

The image sensor of the optical system image capturing section 4 is 640 pixels by 480 pixels, for example, and outputs the electric signals with a magnitude according to the light receiving amount of each pixel to the line segment extraction section 1. The line segment extraction section 1 converts the image signals (analog signals) from the image sensor of the optical system image capturing section 4 into grayscale digital signals, and extracts line segments from the converted digital image signals.

The line segment extraction processing of the line segment extraction section 1 will be described with reference to FIG. 2. The captured image is stored as grayscale digital signals. The LoG filter processing section 40 smoothes the grayscale image data, removes noise, and performs differentiation twice, to enhance the edge of the image. For example, if the LoG filter processor 40 is executed on grayscale captured image G1 (e.g. captured image of skin surface) in FIG. 3, noise is removed by smoothing (integration), and the edge of the image is enhanced by differentiation, and the image shown in FIG. 4 (blurred line segment image) G2 is acquired.

Figure 4:
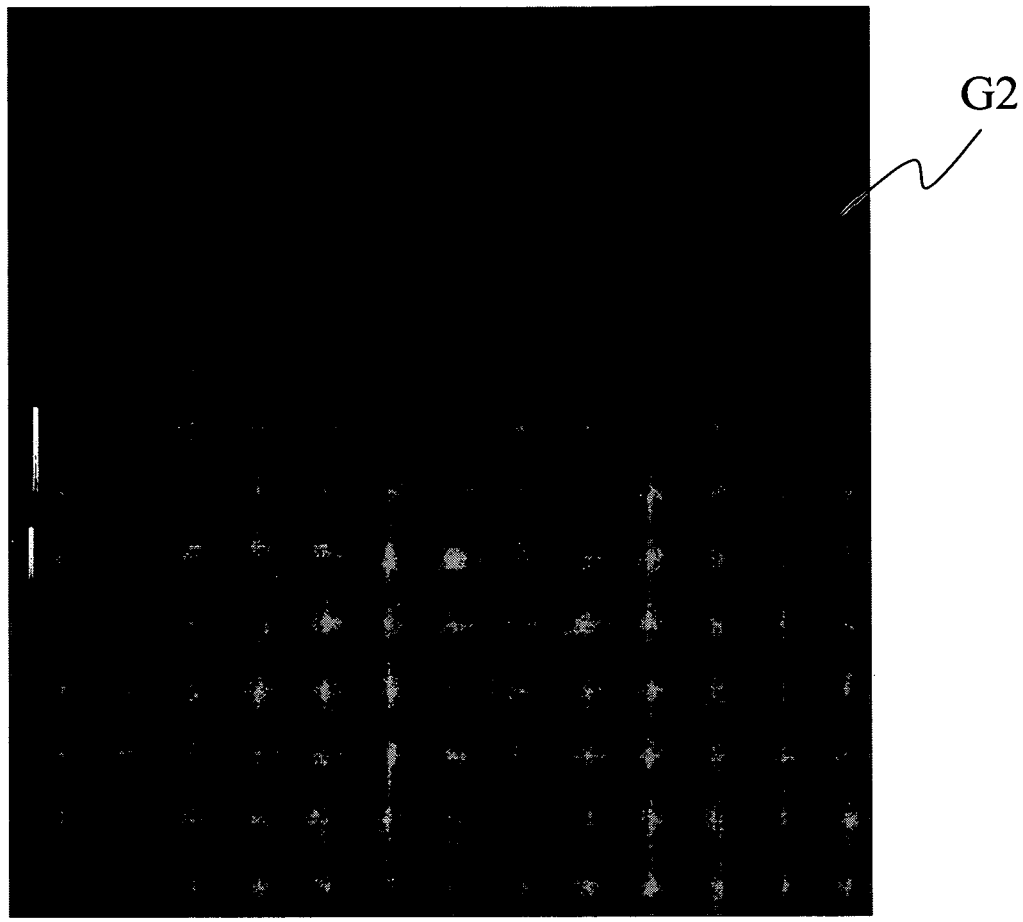
FIG. 4 shows an example of an image after LoG filter processing in FIG. 3.
Figure 5:
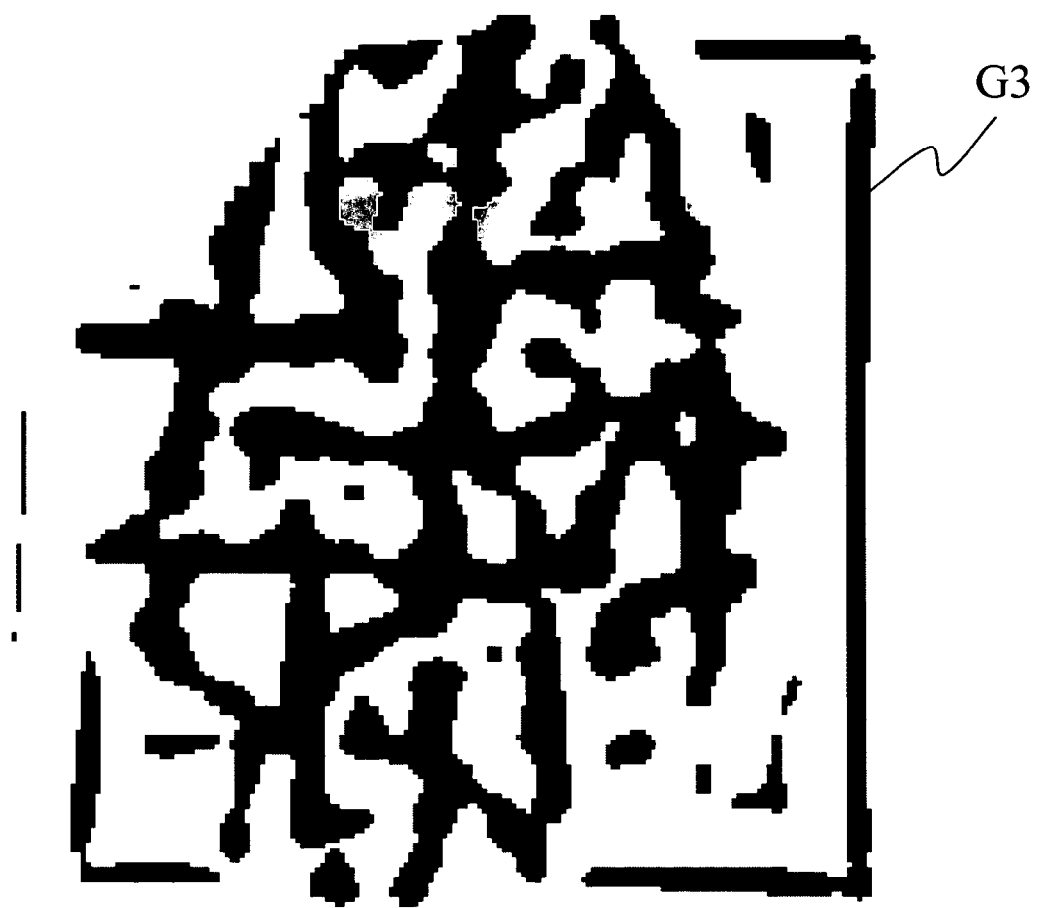
FIG. 5 shows an example of area selection from the image in FIG. 4.

An area selection processing 42 binarizes this image G2 with a predetermined threshold and selects an area for performing the later mentioned top hat summation processing, which is one of morphology processing. For example, if the LoG filter processed image G2, shown in FIG. 4, is binarized, the area selection image shown in FIG. 5 is acquired. In FIG. 5, the black portion is selected as an area for performing top hat summation processing 44.

Then in the top hat summation processing 44, continuous linear elements are extracted from the LoG filter-processed image G2. For this, the top hat summation processing 44 is comprised of opening processing 44-1, wherein a predetermined length of pixels (called an element or operator) is scanned in a predetermined direction, and a top envelope image to which the operator can enter in a direction of a higher brightness level is created, and top hat summation processing 44-2 for subtracting the top envelope image from the original image G2 to create the top hat image, and adding the top hat image in a plurality of scanning directions for each pixel.

Figure 6:
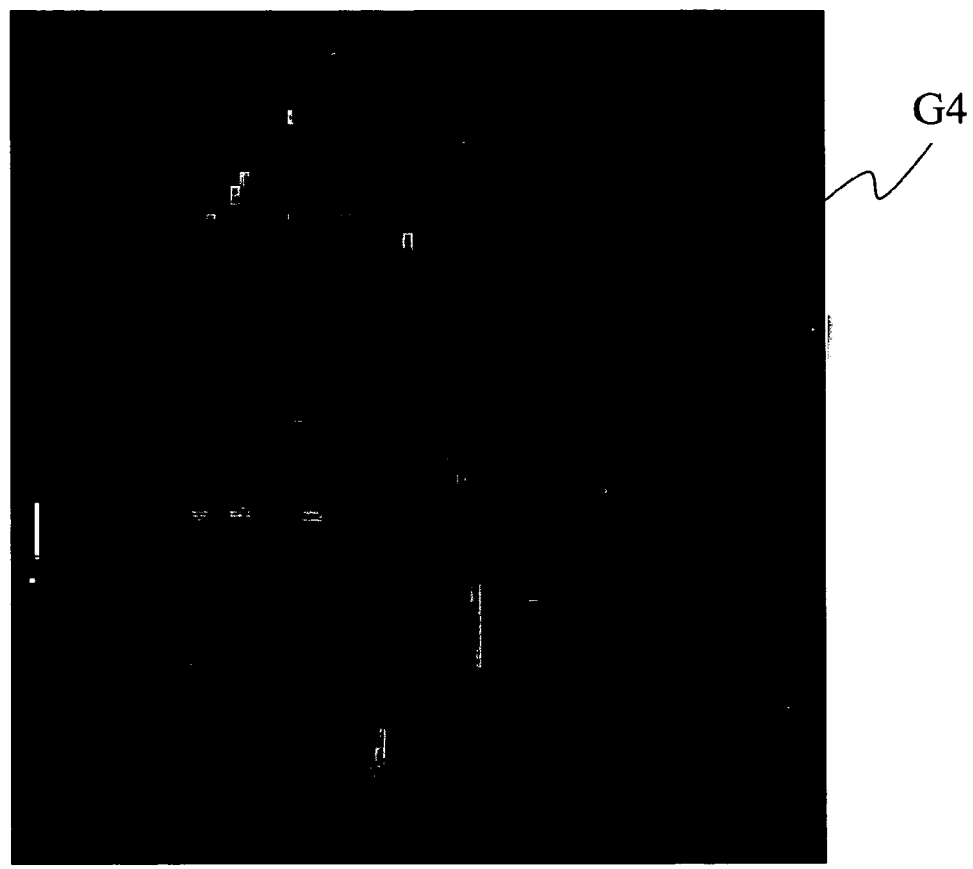
FIG. 6 shows an example of an image after the morphology processing in FIG. 4.

For example, if top hat summation processing is performed on the image G2 in FIG. 4, isolated line segments are removed, and image G4, with only continuous linear components (white portions in FIG. 6) is acquired, as shown in FIG. 6. In the present embodiment, top hat summation processing 44 is performed only on the above mentioned selected areas (FIG. 5), that is the area where continuous line segments possibly exist.

If top hat summation processing 44, which is a morphology processing, is performed in a plurality of directions on an entire image (300,000 pixels in the case of the above example), processing time becomes long. Since the directions of the line segments are unspecified and many, in order to extract continuous line segments accurately the more scanning directions the better, such as 12 directions (every 30 degrees) of scanning is preferable. In this case, time for extraction processing of continuous line segments becomes long. In order to decrease this extraction processing time, it is effective to perform top hat summation processing 44 on an area where continuous line segments possibly exist, as shown in this embodiment.

When the processing target is grayscale data, a portion where the contrast ratio is different may exist within a continuous line segment. Therefore in the case when the line segment image after top hat summation processing is performed is binarized and line segments are extracted, the portion where the contrast ratio is low is not extracted as a part of the line segment, even if it is continuous from the portion where the contrast ratio is high.

In the present embodiment, to detect a continuous line segment having portions where the contrast ratio is different, extraction target area selection processing 46 is performed. The extraction target area selection processing 46 is a processing to extract such portion of which contrast ratio is low, continuing the portion of which contrast ratio is high in the ling segment growth direction, as one line segment.

For this, the extraction target area selection processing 46 is comprised of an extraction range selection processing 46-1 for selecting an area of which contrast ratio is relatively high in the image G4 after the top hat summation processing 44 is performed as the extraction area, a histogram creation processing 46-2 for creating the histogram of the extraction range selected in the extraction range selection processing 46-1, a mask area/marker area selection processing 46-3 for selecting an area of which brightness level is relatively high in the histogram as a mask area and selecting an area of which brightness level is even higher in the mask area as the marker area, and a reconstruction processing 46-4 for reconstructing line segments which continue from the marker area in the growth direction from the line segments in the image G4 in the selected mask area.

Figure 7:
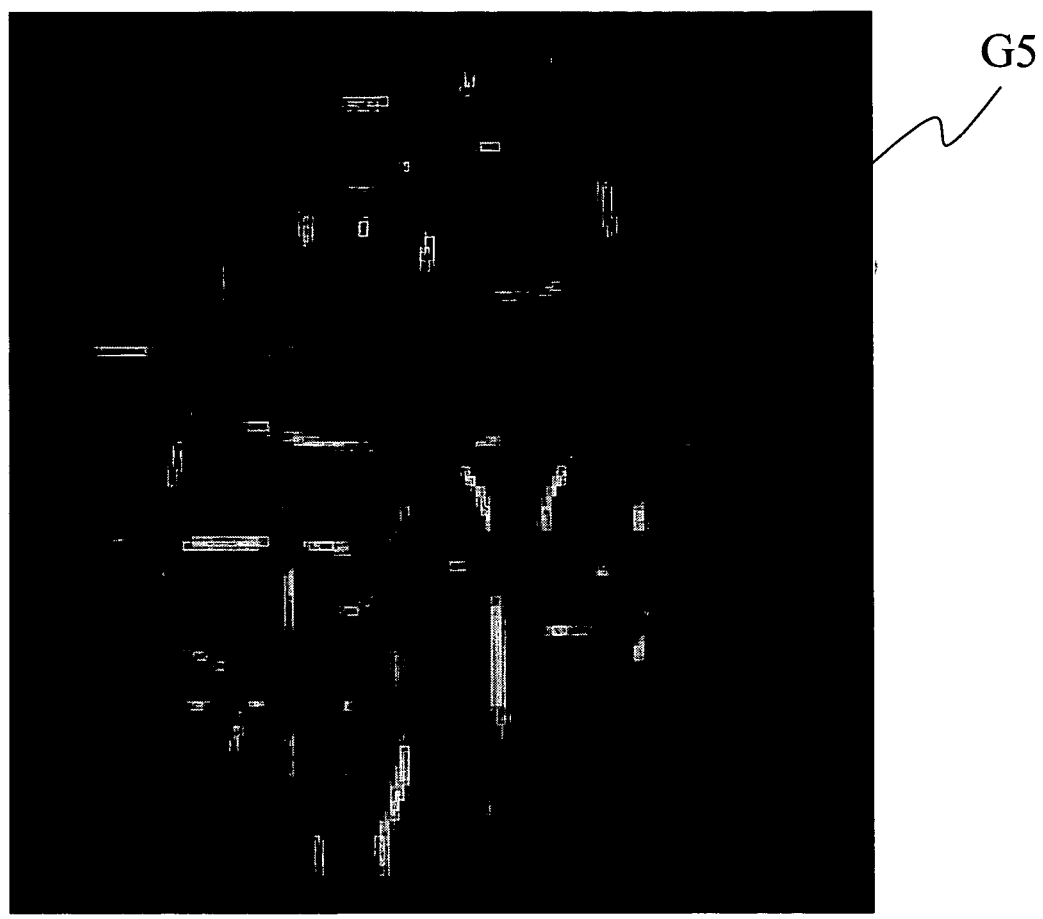
FIG. 7 shows an example of an image after the extraction target selection processing in FIG. 6.

When the extraction target selection processing is performed on the line segments in the image G4 in FIG. 6, the portions of which contrast ratio is low, connecting to the portion of which contrast ratio of continuous line segments is high, are also reconstructed as the same continuous line segments (white portions in FIG. 7) as image G5 in FIG. 7 shows. According to the present invention, continuous line segments of which contrast ratio is the same can be acquired here by performing this processing 46.

Figure 8:
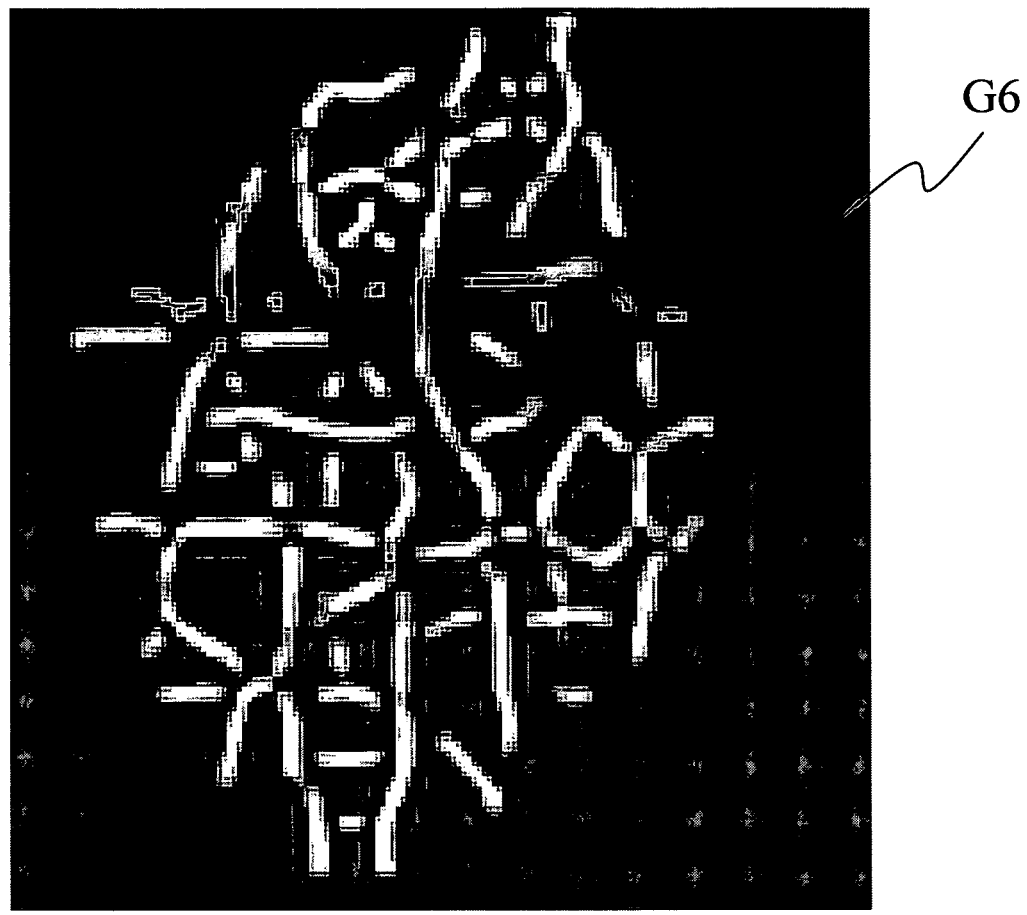
FIG. 8 shows an example of an image after LoG filter processing in FIG. 7.
Figure 9:
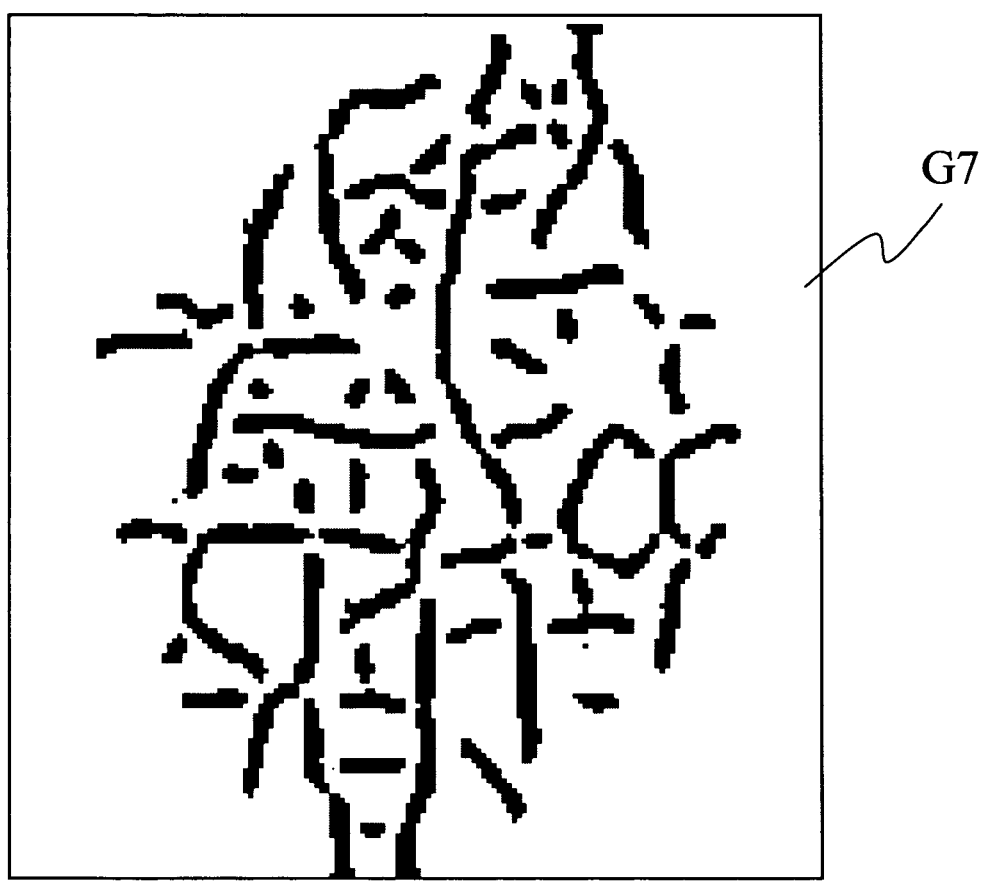
FIG. 9 shows an example of an image after the binary processing in FIG. 8.

LoG filter processing 47 is performed again on this reconstructed image G5, smoothing and edge enhancement are performed, and the smoothed and edge-enhanced line segment image G6 in FIG. 8 is acquired. This line segment image G6 is binarized using a predetermined threshold in the binary processing 48, and the binary line segment image G9 shown in FIG. 9 is acquired. And a line segment having a certain width is thinned by the thinning processing 49, and the line segment image with a predetermined width (e.g. 1 pixel) is acquired.

In this way, when continuous line segments are extracted by morphology processing, the range of morphology processing is limited to an area where the continuous line segments possibly exist in the image, therefore the processing time of morphology processing which normally takes time can be decreased.

Also when the line segments are extracted from the line segment image acquired after morphology processing, an area of which contrast ratio is low is also reconstructed as a continuous line segment if it is continued from an area of which contrast ratio is high, so continuous line segments can be accurately extracted regardless the contrast ratio.

Image Processing Method

Now the line segment extraction processing mentioned in FIG. 2 will be described. FIG. 10 is diagram depicting the LoG filter processing 40 in FIG. 2.

In the description of the LoG filter processing 40 below, it is assumed that the input image is f, and the image brightness on the xy coordinates (on the image sensor) is $f(x, y)$. The two-dimensional Gaussian function $G(x, y)$ is defined as the following Expression (1).

$$G(x, y) = \frac{1}{2\pi\sigma^2} \exp\left(-\frac{x^2 + y^2}{2\sigma^2}\right) \qquad (1)$$

The smoothed image F (x, y) is acquired by the convolution of the Gaussian function G and the input image f using the following Expression (2).

$$F(x, y) = (G * f)(x, y) = \int_{-\infty}^{\infty} \int_{-\infty}^{\infty} G(x-s, y-t) f(s, t) \, ds \, dt \qquad (2)$$

By partially differentiating this smoothed image F (x, y) twice, the output g (x, y) of LoG filter is acquired using the following Expression (3).

$$g(x,y) = \nabla^2 F(x,y) = \nabla^2 (G * f)(x,y) \qquad (3)$$

In Expression (3), ∇(nabla) indicates partial differentiation, and in Expression (3), the smoothed image F(x, y) is partially differentiated twice. In other words, in the LoG filter processing 40, the image is smoothed by integration, and the edge is enhanced by twice the partial differentiation.

Figure 3:
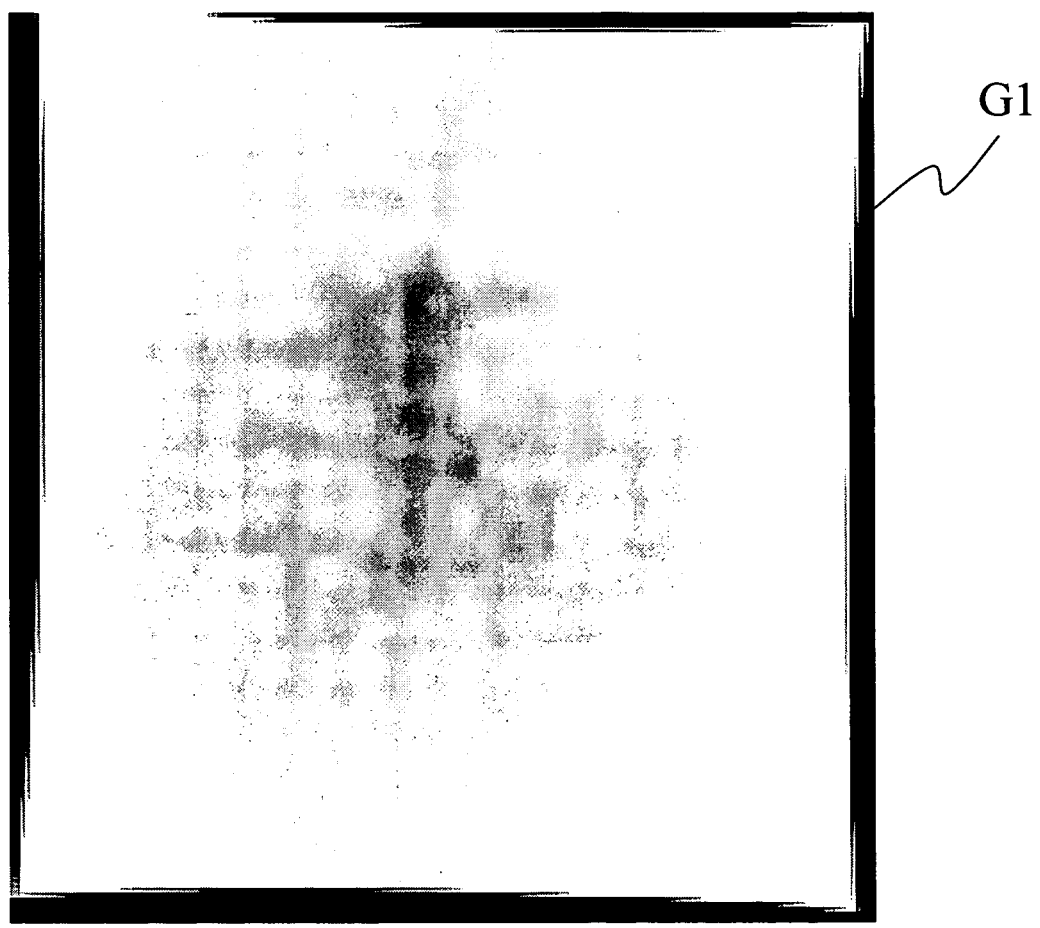
FIG. 3 shows an example of a captured image in FIG. 1 and FIG. 2.

The operation of the LoG filter processing 40 will now be described with reference to FIG. 10. FIG. 10 is model diagram created to simplify description. The x axis and y axis in the three-dimensional coordinates indicate two-dimensional plane coordinates, and the s axis indicates the brightness level. When the LoG filter processing 40 is performed on the input image A1 (f), a smoothed and edge enhanced three-dimensional image A2 (g) is acquired. This image example is shown in FIG. 3 and FIG. 4.

Figure 11:
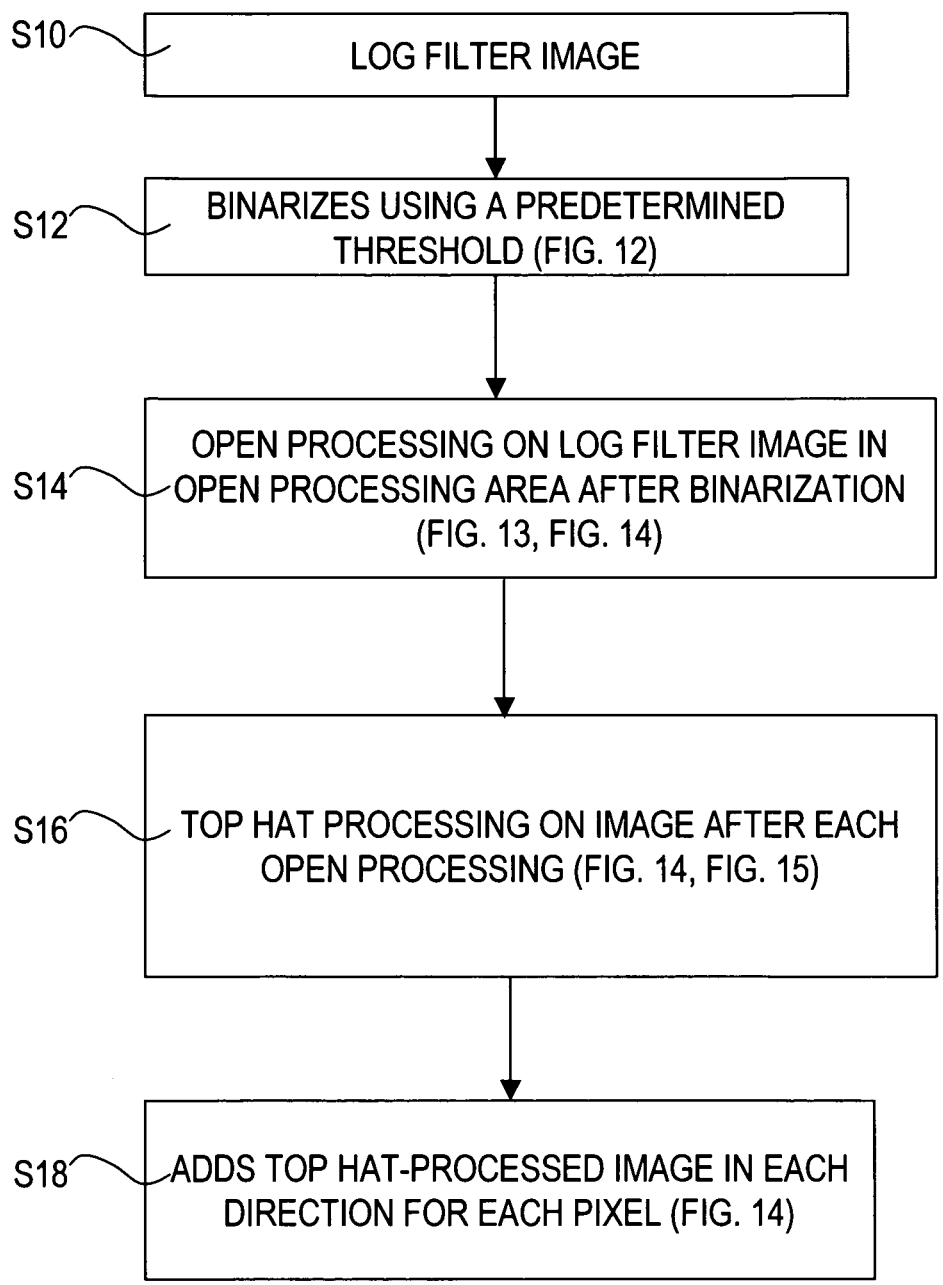
FIG. 11 is a flow chart depicting the area selection processing and top hat summation processing in FIG. 2.
Figure 12:
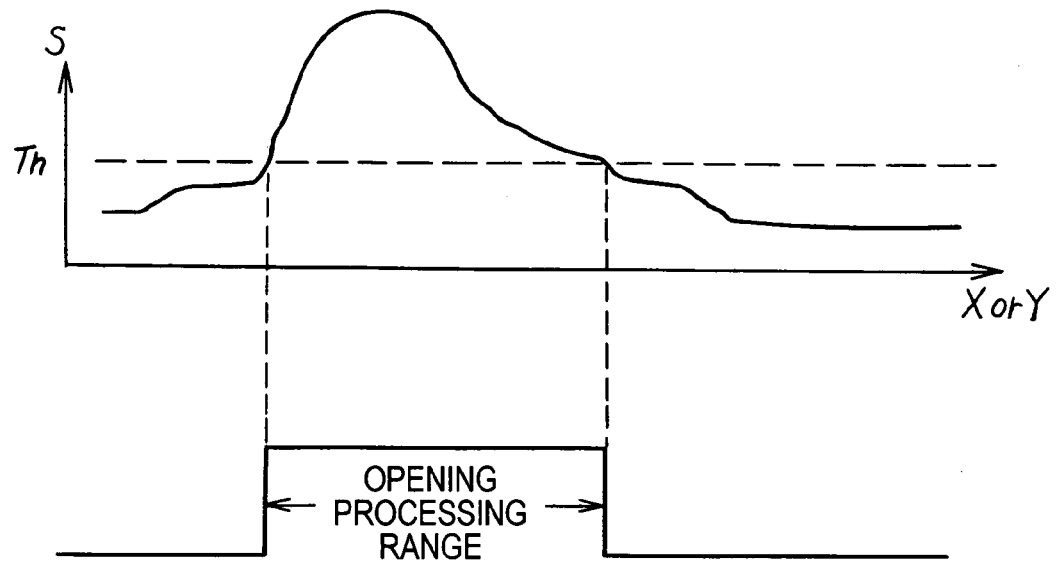
FIG. 12 is a diagram depicting the area selection processing in FIG. 11.
Figure 13:
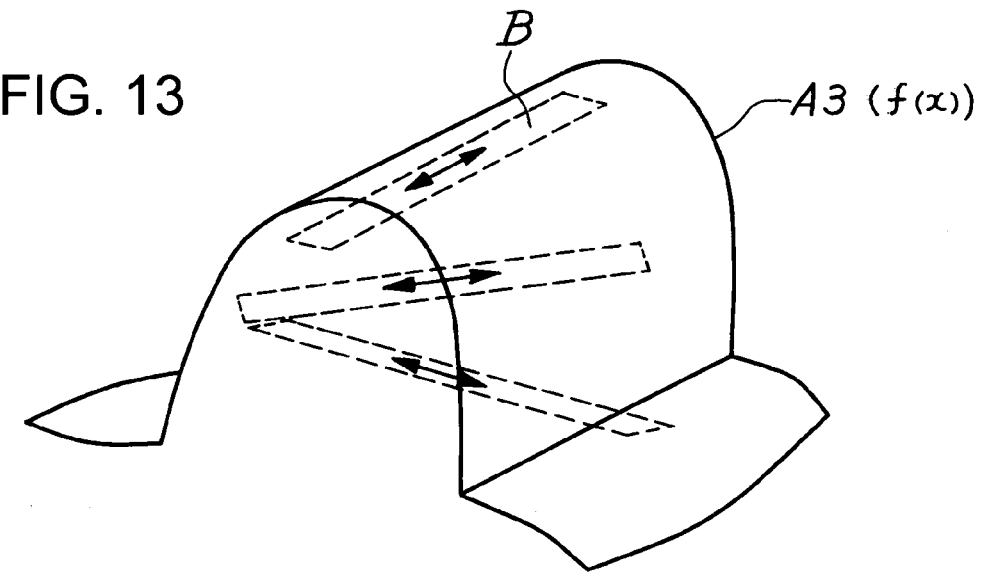
FIG. 13 is a diagram depicting the opening processing in FIG. 11.
Figure 14:
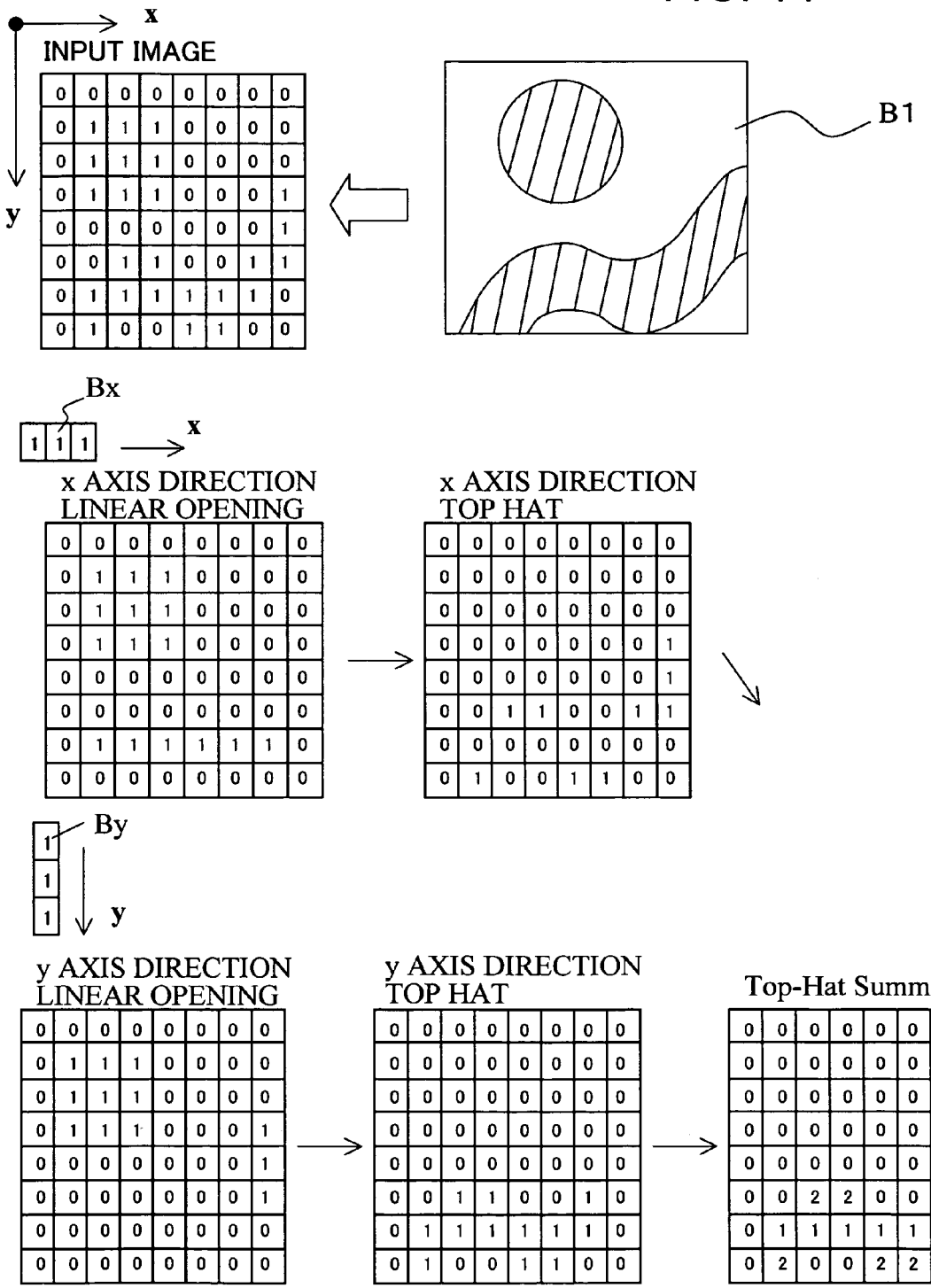
FIG. 14 is diagram depicting the area selection processing and top hat summation processing in FIG. 11.
Figure 15:
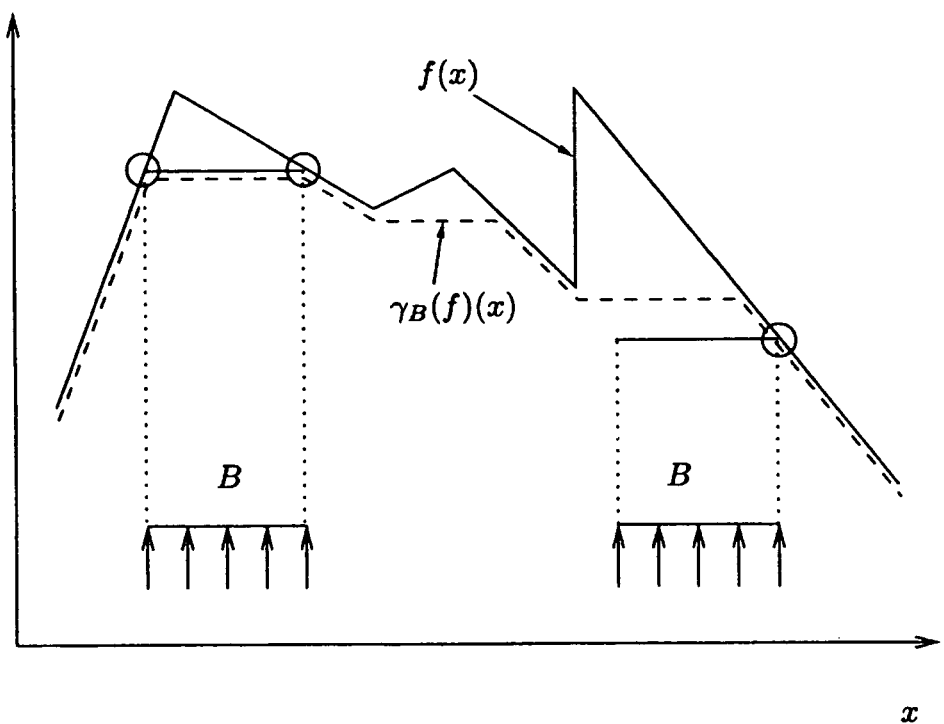
FIG. 15 is a diagram depicting the top hat summation processing in FIG. 11.

Now the area selection processing 42 by binarization and top hat summation processing 44 will be described. FIG. 11 is a processing flow chart depicting the area selection processing 42 by binarization and top hat summation processing 44, FIG. 12 is a diagram depicting the area selection processing operation by binarization in FIG. 11, FIG. 13 is a diagram depicting the opening processing of the top hat summation processing, FIG. 14 are diagrams depicting the top hat summation processing, and FIG. 15 is a diagram depicting the top hat processing.

The processing in FIG. 11 will now be described with reference to FIG. 12 to FIG. 15.

(S10) AS described above, the LoG filter processing 40 is executed on the input image, and a LoG filter image is acquired.

(S12) Then this image is binarized using a predetermined brightness slice value Th, and an opening processing target area is selected. In FIG. 12, two-dimensional coordinates (x or y and s) are shown to simplify description. The input image is sliced by a predetermined brightness slice value Th, and an area exceeding the slice value is determined as the opening processing range. In other words, if the brightness level of the target line segments is high, it is very unlikely that target line segments exist in an area of which brightness level is low, and it is possible that target line segments exist in an area of which brightness level is high. Therefore the processing range of the top hat summation processing 46 for extracting line segments is set not for the entire image but only for an area of which brightness level of the image is high, so that the time required for top hat summation processing, which normally takes time, is decreased.

(S14) In the specified opening area (black portion in FIG. 5), the opening processing is performed on the image after LoG filter processing is performed. The opening processing is already known, but will be briefly described with reference to the model diagrams in FIG. 13 and FIG. 15.

As FIG. 13 shows, the operator (or element) B is scanned on the input image A3 (f (x)). The operator B has a predetermined length. FIG. 13 shows an example of the operator B scanning in three directions. AS FIG. 15 shows, when the operator B scans the input image f (x) in the x axis direction, the input image f (x) is divided into a portion where the operator B can enter and a portion where the operator B cannot enter. The processing to acquire the envelop of γB(f) (x) of the portion where the operator B can enter is called "linear opening processing".

(S16) Using this linear-opened image, top hat processing is performed on the input image. The top hat processing is performed using the following Expression (4).

$$f(x) - \gamma B(f)(x) \qquad (4)$$

In other words, the function of the portion where the operator B cannot enter (this is called "top hat") in FIG. 15 is acquired.

(S18) The image after top hat processing acquired by scanning the operator in each direction is added for each pixel.

This opening processing and top hat summation processing will be described using image examples in FIG. 14. In FIG. 14, the image data when the image B1 is binarized is described using the example of extracting linear components which extend in the x and y directions will be described to simplify description. In the image B1, the hatched portion is an area of which brightness level is high. By binarizing this image, the binarized input image is acquired. In this description, it is assumed that the abscissa is x and the ordinate is y. It is also assumed that the operator Bx in the x direction is an operator having a three pixel length in the x direction, and operator By in the y direction is an operator having a three pixel length in the y direction.

First the operator Bx is scanned in the x direction of the input image, and the locus in which operator Bx can enter is determined, as described above, then the x axis linear opening image is acquired. In other words, the pixel value "1" is assigned to the portions where "1" continues for three pixels in the x axis direction of the input image, otherwise pixel value "0" is assigned.

Using this x axis linear opening image and input image, the x axis top hat image is acquired for each pixel by Expression (4). Compared with the original image B1, this image indicates the contour of the linear components which continue in the x axis direction.

In the same way, the operator By is scanned in the y direction of the input image, and the locus in which the operator By can enter is determined as described above, then the y axis linear opening image is acquired. In other words, pixel value "1" is assigned to the portion where "1" continues for three pixels in the y axis direction of the input image, otherwise pixel value "0" is assigned.

Using this y axis linear opening image and input image, the y axis top hat image is acquired for each pixel by Expression (4). Compared with the original image B1, this image indicates the linear components which continue in the y axis direction.

This x axis top hat image and y axis top hat image are added for each pixel, and the top hat summation image is acquired. Compared with the original image B1, the isolated linear components indicated by black dots in the image B1 are removed, and the continuous linear components of the original image B1 are extracted.

Figure 16:
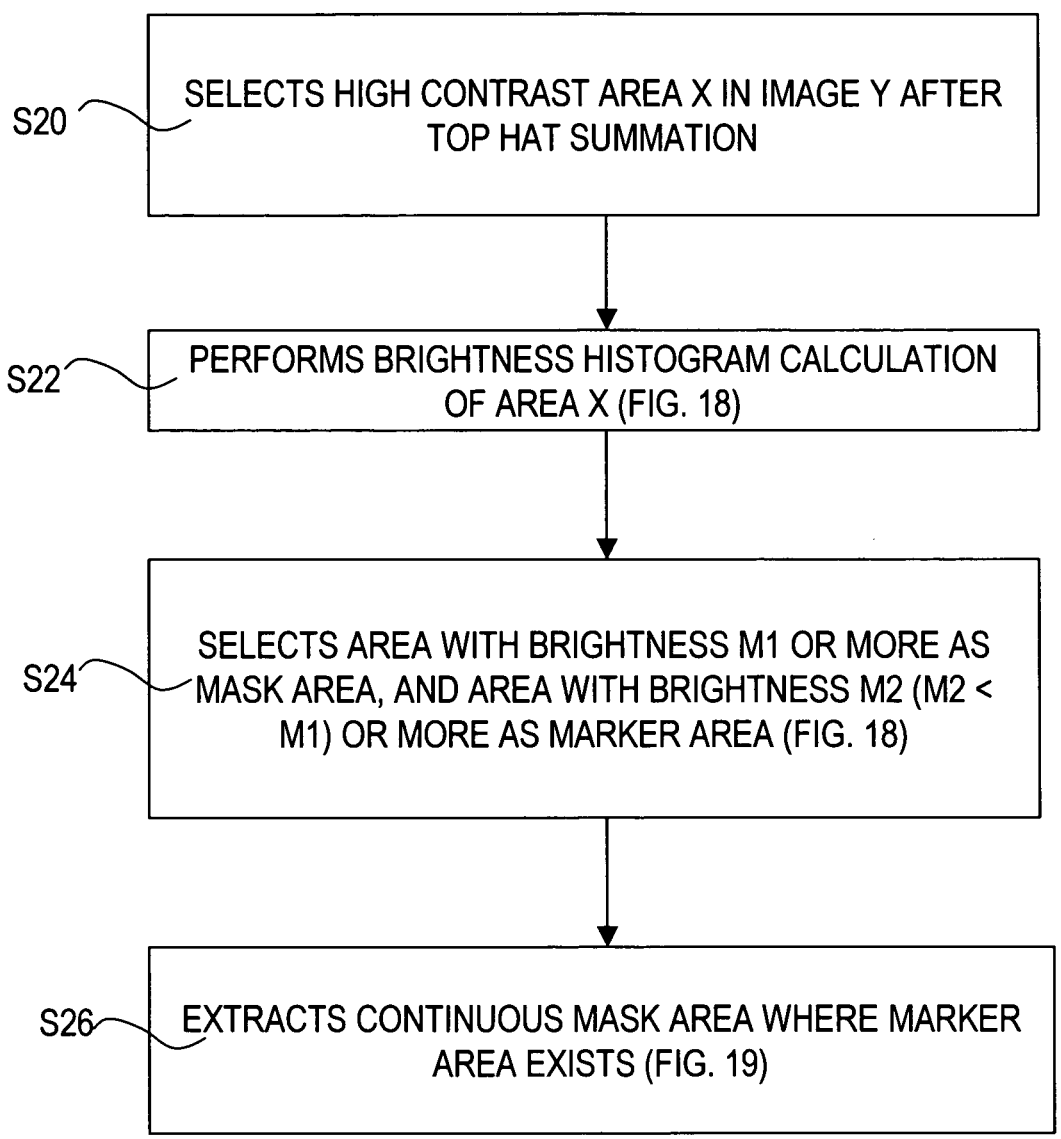
FIG. 16 is a flow chart depicting the extraction area selection processing in FIG. 2.
Figure 17:
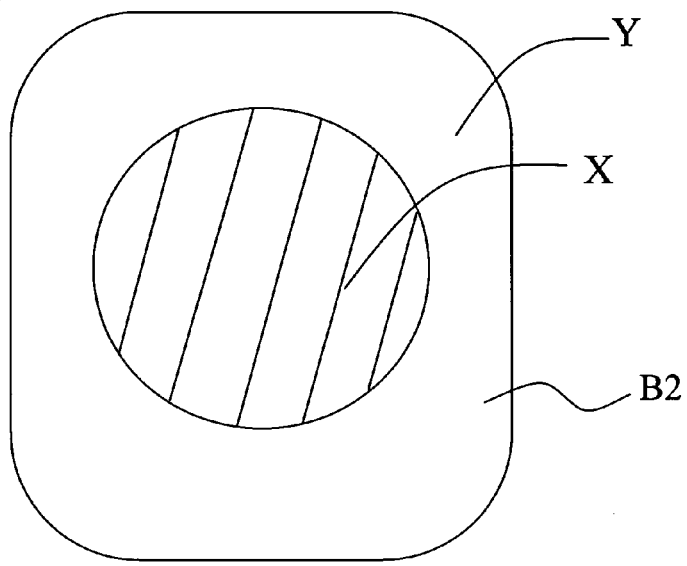
FIG. 17 is a diagram depicting the area specification processing in FIG. 16.
Figure 18:
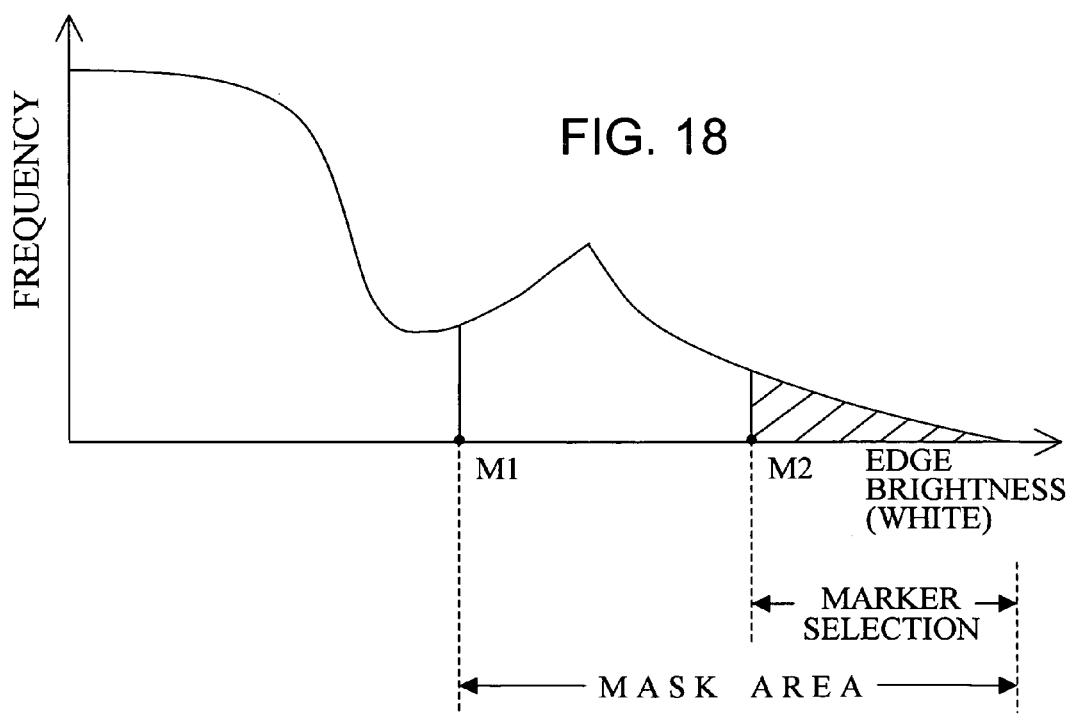
FIG. 18 is a diagram depicting the histogram creation and mask area and marker area detection processing in FIG. 16.

Now the extraction target area selection processing 46 will be described with reference to FIG. 16 to FIG. 19. FIG. 16 is a flow chart depicting the extraction target area selection processing, FIG. 17 is a diagram depicting the extraction range selection processing in FIG. 16, FIG. 18 is a diagram depicting the histogram creation processing and mask/marker area selection processing in FIG. 16, and FIG. 19 are diagrams depicting the reconstruction processing in FIG. 16.

Now the extraction target area selection processing in FIG. 16 will be described with reference to FIG. 17 to FIG. 19.

(S20) An area of which contrast ratio is relatively high out of the image G4 after the top hat summation processing 44 is performed is selected as the extraction range X. As FIG. 17 shows, the center portion of the image Y tends to have a higher contrast ratio than the peripheral portion. This is related to the image capturing conditions. In other words, depending on the performance of the optical system, the light irradiation status to the test subject, and the conditions of the external light of the image capturing device, an image tends to become blurred in the peripheral portion. Therefore in the extraction range selection processing 46-1, the area X, including the center portion of the image Y, excluding the peripheral portion, is selected as the target area, as shown in FIG. 17.

(S22) Then the histogram of the extraction range X selected in the extraction range selection processing 46-1 is calculated. As FIG. 18 shows, the abscissa is the brightness level and the ordinate is the frequency of the pixels, and the number of pixels at each brightness level is calculated as the brightness histogram.

(S24) AS FIG. 18 shows, in this brightness histogram distribution, the brightness level M1, of which frequency is about half compared with the entire frequency, is set as the threshold of the mask area, and the pixels of which brightness level is M1 or more on the histogram are selected as the mask area. Then the brightness level M2, of which frequency is about further half (that is, quarter) compared with the entire frequency, is set as the threshold of the marker area, and the pixels of which brightness level is M2 or more on the histogram are selected as the marker area. In other words, in the histogram, an area of which brightness level is relatively high is selected as the mask area, and an area of which brightness level is even higher in the mask area is selected as the marker area.

(S26) Using this mask area and marker area, the top hat summation-processed image is reconstructed. In other words, as FIG. 19 shows, the pixels of the selected mask area and marker area are converted into an image, then the image B3, having the mask areas C1 and C3 and marker area C2, is created. For the reconstruction, the mask area C1, where the marker area C2 exists, is reconstructed as the line segment D1 as shown in FIG. 19. Here the line segment C3 where no marker area exists, is removed.

In the same way, even if the contrast ratio (level difference between the line segment portion and other portions) of an area is low, it is extracted as one line segment if the area is connected to the line segment elements of which contrast ratio is high. If this processing 46 is not executed, the extracted line segments are either C1 or C3, or only C2, in the case of FIG. 19, and the extracted line segments differ according to the contrast ratio.

Also the marker area and the mask area are determined by the pixel level of an area X of which contrast ratio is high, so the marker area and the mask area are determined, while removing the influence of noise from the peripheral portion of which contrast ratio is low.

Also the marker area and mask area are determined by the frequency histogram of the brightness level of the pixels of the image, so even if the line segment pattern of the image is different, the relative marker area and mask area corresponding to the image can be selected.

Now LoG filter processing 47 will be described with reference to FIG. 20 to FIG. 21. This LoG filter processing 47 is the same as the contents of the LoG filter processing 40, where integration is performed and edge is enhanced by differentiation. However in the LoG filter processing 47 in the subsequent step of the line segment extraction, the purpose is smoothing the line segment D1 acquired in FIG. 19, and enhancing the edge, as shown in FIG. 21. In other words, as FIG. 20 shows, the original image after integration is differentiated twice (two times differentiation). By this, the rugged portion D3 around the line segment D1 is smoothed, as shown in FIG. 21, and the smooth line segment element D2 can be extracted.

This smooth line segment element is binarized by the binary process 48 and thinned by thin process 49, and the skeletonized line segment is acquired. The above mentioned LoG filter processing 47 is effective to perform binarization and thinning, and the line segment can be easily thinned.

Other Embodiments

In the above embodiments, the operator of the top hat summation 44 was described as one with a 1 pixel width by 3 pixels length, but the length and width of the operator can be selected according to the extraction target line segment and the required accuracy, and can be about 20 pixels, for example. The shape of the operator is not limited to a rectangle, but may be other shapes, such as an ellipse.

The number of scanning directions of the operator can be selected according to the direction of the extraction target line segments, the accuracy and the processing time, and four or more is desirable. When the number of scanning directions is low and a longer processing time can be taken, the area selection processing 42 by binarization may be omitted. In the same way, the extraction target selection processing 46 may be omitted if the targets have the same contrast ratio.

The top hat summation processing was described as a morphology processing, but other methods where the method scans an element or operator over the image in a plurality of directions and extracts linear elements from the extracted image in each direction, may be used. The application field is not limited to skin surface, but may be for the image of vessels of a living body, or patterns of a living body, for example.

The present invention was described by the embodiments, but the present invention can be modified in various ways within the scope of the essential character of the present invention, and these shall not be excluded from the scope of the present invention.

Since morphology processing is performed on an area where continuous line segments possibly exist by scanning an operator, line segment elements can be extracted in a plurality of directions at high-speed. Also an area of which contrast ratio is low, continuing from an area of which contrast ratio is high in the line segment growth direction is also extracted as one line segment, so line segments can be extracted with high accuracy, regardless the contrast ratio. Therefore continuous line segments can be accurately extracted from a blurred image.

What is claimed is:

1. An image processing method for extracting line segment elements from a grayscale captured image, comprising the steps of:
   executing morphology processing by scanning an operator over an image according to said captured image in a plurality of directions and extracting linear elements from the scanned images in each direction;

extracting an area of which contrast ratio is relatively high and an area of which contrast ratio is relatively low from the image on which said morphology processing is performed; and extracting the linear elements in said area of which contrast ratio is relatively low, connecting to said area of which contrast ratio is relatively high, as the line segment elements, and wherein said extracting line segment elements further comprises:
- a step of specifying an area of which contrast ratio of the image according to said captured image is possibly high;
- a step of extracting an area of which contrast ratio is relatively high and an area of which contrast ratio is relatively low for said specified area of said morphology-processed image; and
- a step of extracting linear elements in said area of which contrast ratio is relatively low, connecting to said area of which contrast ratio is relatively high, as the line segment elements, and wherein said step of extracting the area further comprises:
- a step of calculating a brightness frequency histogram in said specified area; and
- a step of extracting said area of which contrast ratio is relatively high and area of which contrast ratio is relatively low from said frequency histogram, and wherein said step of extracting said areas from said frequency histogram further comprises a step of extracting a mask area of which brightness level is relatively low as an area of which contrast ratio is relatively low, and a marker area of which brightness level is relatively high as an area of which contrast ratio is relatively high, from said frequency histogram.

2. An image processor for extracting line segment elements from a grayscale captured image, comprising:
- an image capturing device for capturing the image of a test subject; and
- a line segment extraction device for executing morphology processing for extracting linear elements from the extracted images in each direction by scanning an operator over an image according to said captured image which is captured by said image capturing device in a plurality of directions, extracting an area of which contrast ratio is relatively high and an area of which contrast ratio is relatively low from the image on which said morphology processing is performed, and extracting the linear elements in said area of which contrast ratio is relatively low, connecting to said area of which contrast ratio is relatively high, as the line segment elements, wherein said line segment extraction device extracts an area of which contrast ratio is relatively high and an area of which contrast ratio is relatively low from an area of which contrast ratio of said captured image is possibly high out of said morphology processed image, and extracts linear elements in said area of which contrast ratio is relatively low, connecting to said area of which contrast ratio is relatively high, as line segment elements, wherein said line segment extraction device calculates a brightness frequency histogram in said area of which contrast ratio of said captured image is possibly high out of said morphology processed image, and extracts said area of which contrast ratio is relatively high and area of which contrast ratio is relatively low from said brightness frequency histogram, and wherein said line segment extraction device extracts a mask area of which brightness level is relatively low as an area of which contrast ratio is relatively low, and a marker area of which brightness level is relatively high as an area of which contrast ratio is relatively high, from said frequency histogram.

3. The image processing method according to claim 1, further comprising the steps of:
- executing LoG filter processing on said grayscale captured image of the living body, said LoG filter processing including smoothing said grayscale captured image and performing differentiation twice to enhance edges of the smoothed image to produce a LoG filter processing images; and
- binarizing said LoG filter processing image with a threshold value to produce a binarized image and selecting an area of which an image value of said LoG filter processing image is more than the threshold value as an extraction area of said LoG filter processed image from said binarized image, and wherein the executing morphology processing comprises executing grayscale morphology processing on said selected extraction area of said LoG filter processed image, said grayscale morphology processing including scanning an operator in a plurality of directions in said selected extraction area of said LoG filtered processed image and extracting linear elements from the selected extraction area of said LoG filter processed image in each direction.

4. The image processing method according to claim 1, further comprising a step of binarizing an image according to said captured image, and selecting an extraction area of said captured image for which said morphology processing is executed.

5. The image processing method according to claim 1, wherein said step of extracting said line segment elements further comprises a step of extracting said mask area having said marker area as said line segment element.

6. The image processing method according to claim 1, further comprising:
- a step of subjecting said extracted line segment elements to smoothing and edge enhancement processing; and
- a step of creating line segment data by binarizing said smoothed and edge-enhanced line segment elements.

7. The image processing method according to claim 1, wherein said step of executing morphology processing further comprises:
- a step of scanning said operator in a plurality of directions and creating an open processing image in each direction;
- a step of creating a top hat processing image in each of said directions from an image according to said captured image and the open processing image in each of said directions; and
- a step of extracting said linear elements by adding the top hat processing image in each of said directions.

8. The image processor according to claim 2 wherein the line segment extraction device is configured to execute LoG filter processing on the grayscale captured image of the living body, said LoG filter processing including smoothing said grayscale captured image and performing differentiation twice to enhance edges of the smoothed image to produce a LoG filtered processed image, to binarize said LoG filter processed image with a threshold value to produce a binarized image, to select an area of which an image value of said LoG filter processed image is more than the threshold value as an extraction area of said LoG filter processed image from said binarized image, and to execute grayscale morphology processing on said selected extraction area of said binarized image, said grayscale morphology processing including scanning an operator in a plurality of directions in said selected extraction area and extracting linear elements from the extracted image in each direction, and extracting continuous line segment elements of the living body from said extracted linear elements.

9. The image processor according to claim 2, wherein said line segment extraction device binarizes an image according to said captured image and selects an extraction area of said captured image for which said morphology processing is executed.

10. The image processor according to claim 2, wherein said line segment extraction device extracts said mask area having said marker area as said line segment elements.

11. The image processor according to claim 2, wherein said line segment extraction device subjects said extracted line segment elements to smoothing and edge enhancement processing, and creates line segment data by binarizing said smoothed and edge-enhanced line segment elements.

12. The image processor according to claim 2, wherein said line segment extraction device scans said operator in a plurality of directions and creates an open processing image in each direction, and creates a top hat processing image in each of said directions from an image according to said captured image and the open processing image in each of said directions, and extracts said linear elements by adding the top hat processing image in each of said directions.

* * * * *